United States Patent
Hisaoka

(10) Patent No.: US 8,302,414 B2
(45) Date of Patent: Nov. 6, 2012

(54) REFRIGERANT SYSTEM DETECTION METHOD, REFRIGERANT SYSTEM DETECTION SYSTEM AND STORAGE COMPONENT WITH REFRIGERANT SYSTEM DETECTION PROGRAM

(75) Inventor: Kunitoshi Hisaoka, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 509 days.

(21) Appl. No.: 12/666,318

(22) PCT Filed: Jul. 3, 2008

(86) PCT No.: PCT/JP2008/062046
§ 371 (c)(1), (2), (4) Date: Dec. 23, 2009

(87) PCT Pub. No.: WO2009/005116
PCT Pub. Date: Jan. 8, 2009

(65) Prior Publication Data
US 2010/0319362 A1  Dec. 23, 2010

(30) Foreign Application Priority Data
Jul. 5, 2007 (JP) ................................. 2007-177257

(51) Int. Cl.
F25D 17/06 (2006.01)
(52) U.S. Cl. ...................................................... 62/190
(58) Field of Classification Search .............. 62/56, 127, 62/190
See application file for complete search history.

(56) References Cited

U.S. PATENT DOCUMENTS 5,207,070 A * 5/1993 Miyazaki ......................... 62/160
6,298,677 B1 * 10/2001 Bujak, Jr. ........................ 62/158

FOREIGN PATENT DOCUMENTS

| JP | 06-147605 A | 5/1994 |
| JP | 06-265197 A | 9/1994 |
| JP | 07-71809 A | 3/1995 |
| JP | 07-91718 A | 4/1995 |
| JP | 2667950 B2 | 6/1997 |
| JP | 3113422 B2 | 9/2000 |
| JP | 2001-41534 A | 2/2001 |
| JP | 2003-90585 A | 3/2003 |
| JP | 2006-118765 A | 5/2006 |
| JP | 2006-214689 A | 8/2006 |
| JP | 2007-85673 A | 4/2007 |
| KR | 2001-0080320 A | 8/2001 |
| KR | 2005-0046435 A | 5/2005 |

OTHER PUBLICATIONS

Office Action of corresponding Korean Application No. 2010-7001575 dated Jul. 13, 2011.

* cited by examiner

Primary Examiner — Melvin Jones
(74) Attorney, Agent, or Firm — Global IP Counselors

(57) ABSTRACT

A refrigerant system detection method for detecting refrigerant systems in an air conditioning system includes a drive step, an operation inhibition step and a recording step. The air conditioning system includes a plurality of indoor units having temperature sensors respectively connected to a plurality of outdoor units. The drive step puts the plurality of outdoor units into a driven state after a start-up time. The operation inhibition step stops or weakens the outdoor units one unit at a time after the drive step. The recording step correlates and records the outdoor units in which operation has been inhibited and the indoor units in which detection values of the temperature sensors have changed as a result of the outdoor units being inhibited. A refrigerant system detection system includes the connected indoor and outdoor units and a management component configured to perform the method. A storage component includes a program to perform the method.

13 Claims, 19 Drawing Sheets

REFRIGERANT SYSTEM DETECTION METHOD, REFRIGERANT SYSTEM DETECTION SYSTEM AND STORAGE COMPONENT WITH REFRIGERANT SYSTEM DETECTION PROGRAM

CROSS-REFERENCE TO RELATED APPLICATIONS

This U.S. National stage application claims priority under 35 U.S.C. §119(a) to Japanese Patent Application No. 2007-177257, filed in Japan on Jul. 5, 2007, the entire contents of which are hereby incorporated herein by reference.

TECHNICAL FIELD

The present invention relates to a refrigerant system detection method, a refrigerant system detection system and a refrigerant system detection program that detect refrigerant systems resulting from outdoor units and indoor units.

BACKGROUND ART

Conventionally, there have been utilized air conditioning systems where plural outdoor units and plural indoor units are interconnected such that plural refrigerant systems are formed. In such air conditioning systems, an outdoor unit and the indoor units connected to that outdoor unit are regarded as belonging to the same refrigerant system, and air conditioning control is performed per refrigerant system.

Additionally, in the air conditioning system described in Japanese Patent Publication No. 2007-85673 below, there is proposed a method of causing the outdoor units to operate one unit at a time, identifying the indoor units whose state quantities change at that time, and detecting that that outdoor unit and those indoor units are in the same refrigerant system.

SUMMARY OF THE INVENTION

Technical Problem

However, in the air conditioning system described in Japanese Patent Publication No. 2007-85673, when there are plural refrigerant systems, there arises the need to cause operation of the outdoor units to start one unit at a time each time the air conditioning system detects each refrigerant system. For this reason, when start-up time becomes necessary when causing operation of the outdoor units to start, there arises the need to wait for the elapse of the start-up time each time the air conditioning system detects a refrigerant system.

The present invention has been made in light of the aforementioned point, and it is a problem of the present invention to provide a refrigerant system detection method, a refrigerant system detection system and a refrigerant system detection program that are capable of performing refrigerant system detection in a short amount of time.

Solution to the Problem

A refrigerant system detection method pertaining to a first aspect of the invention is a refrigerant system detection method that detects refrigerant systems in an air conditioning system comprising a plurality of indoor units having physical quantity sensors respectively and a plurality of outdoor units connected to the plurality of indoor units respectively, the refrigerant system detection method comprising a drive step, an operation inhibition step and a recording step. The drive step puts the plural outdoor units into a driven state after start-up time required for start-up. Here, "start-up time" means, for example, an amount of time required for start-up such as driving and stabilizing the outdoor units. The operation inhibition step inhibits operation by stopping or weakening the output of the outdoor units one unit at a time after the drive step. The recording step correlates and records the outdoor unit whose operation has been inhibited and the indoor units in which detection values of the physical quantity sensors have changed as a result of operation of that outdoor unit being inhibited.

Here, the refrigerant system detection method inhibits operation by stopping or weakening the output of the plural outdoor units in the driven state one unit at a time in order to identify the indoor units that are connected to the outdoor units and detect the refrigerant systems. Thus, the refrigerant system detection method can detect the indoor units that belong to the same refrigerant system as the outdoor unit whose operation has been inhibited by identifying the indoor units in which the detection values of the physical quantity sensors have changed in correspondence to the timing when operation of the outdoor unit has been inhibited. Moreover, the plural outdoor units are all placed in an operating state rather than being started one unit at a time, so the start-up times of the outdoor units can be allowed to advance at the same time. Additionally, it suffices simply to sequentially inhibit operation of the target outdoor unit each time the system of each outdoor unit is to be detected. For this reason, it becomes unnecessary to wait for the elapse of the start-up time of the outdoor unit each time the system of each outdoor unit is to be detected.

Thus, it becomes possible to shorten the amount of time required for refrigerant system detection.

A refrigerant system detection method pertaining to a second aspect of the invention is the refrigerant system detection method pertaining to the first aspect of the invention, wherein the physical quantity sensors are temperature sensors.

Here, by focusing on a change in temperature, it becomes possible to perform refrigerant system detection.

A refrigerant system detection method pertaining to a third aspect of the invention is the refrigerant system detection method pertaining to the second aspect of the invention, wherein the indoor units have indoor heat exchangers. Additionally, the temperature sensors detect temperature of refrigerant flowing through the indoor heat exchangers.

Here, by focusing on a change in the temperature of the refrigerant, it becomes possible to perform refrigerant system detection.

A refrigerant system detection method pertaining to a fourth aspect of the invention is the refrigerant system detection method pertaining to the second aspect of the invention, wherein the indoor units condition temperature of indoor air. Additionally, the temperature sensors detect temperature of conditioned air that is conditioned by the indoor units.

Here, by focusing on a change in the temperature of the conditioned air that is detected by the temperature sensors, it becomes possible to perform refrigerant system detection.

A refrigerant system detection method pertaining to a fifth aspect of the invention is the refrigerant system detection method pertaining to the third or fourth aspect of the invention, wherein the start-up time is an amount of time required from when operation of the outdoor units is started to until the temperature detected by the temperature sensors becomes constant.

Here, by placing the outdoor units in a driven state after the elapse of the start-up time and waiting until the detection values of the temperature sensors become stable, it becomes possible to more easily grasp the change in the detection values of the temperature sensors resulting from operation of the outdoor units being stopped thereafter.

Thus, it becomes possible to more definitely perform system detection.

A refrigerant system detection system pertaining to a sixth aspect of the invention comprises a plurality of indoor units, a plurality of outdoor units and a management component. The indoor units has a physical quantity sensor respectively. The outdoor units connected to the indoor units to configure refrigerant circuits. The management component puts the plural outdoor units into a driven state after start-up time required for start-up, thereafter performs operation inhibition control that stops or weakens the output of the outdoor units one unit at a time, and correlates and records the outdoor unit on which the operation inhibition control has been performed and the indoor units in which detection values of the physical quantity sensors have changed as a result of that outdoor unit being operation-inhibition-controlled. Here, "start-up time" means, for example, an amount of time required for start-up such as driving and stabilizing the outdoor units.

Here, the refrigerant system detection system inhibits operation by stopping or weakening the output of the plural outdoor units in the driven state one unit at a time in order to identify the indoor units that are connected to the outdoor units and detect the refrigerant systems. Thus, the refrigerant system detection system can detect the indoor units that belong to the same refrigerant system as the outdoor unit whose operation has been inhibited by identifying the indoor units in which the detection values of the physical quantity sensors have changed in correspondence to the timing when operation of the outdoor unit has been inhibited. Moreover, the plural outdoor units are all placed in an operating state rather than being started one unit at a time, so the start-up times of the outdoor units can be allowed to advance at the same time. Additionally, it suffices simply to sequentially inhibit operation of the target outdoor unit each time the system of each outdoor unit is to be detected. For this reason, it becomes unnecessary to wait for the elapse of the start-up time of the outdoor unit each time the system of each outdoor unit is to be detected.

Thus, it becomes possible to shorten the amount of time required for refrigerant system detection.

A refrigerant system detection program pertaining to a seventh aspect of the invention is a refrigerant system detection program detecting a refrigerant system in an air conditioning system comprising a plurality of indoor units having physical quantity sensors respectively connected to a plurality of outdoor units, the refrigerant system detection program comprising a drive step, an operation inhibition step and a recording step. In the drive step, a management component puts the plural outdoor units into a driven state after start-up time required for start-up. In the operation inhibition step, the management component stops or weakens the output of the outdoor units one unit at a time to inhibit operation after the drive step. In the recording step, the management component correlates and records the outdoor unit whose operation has been inhibited and the indoor units in which detection values of the physical quantity sensors have changed as a result of operation of that outdoor unit being inhibited. Here, "start-up time" means, for example, an amount of time required for start-up such as driving and stabilizing the outdoor units.

Here, the refrigerant system detection program inhibits operation by stopping or weakening the output of the plural outdoor units in the driven state one unit at a time in order to identify the indoor units that are connected to the outdoor units and detect the refrigerant systems. Thus, the refrigerant system detection program can detect the indoor units that belong to the same refrigerant system as the outdoor unit whose operation has been inhibited by identifying the indoor units in which the detection values of the physical quantity sensors have changed in correspondence to the timing when operation of the outdoor unit has been inhibited. Moreover, the plural outdoor units are all placed in an operating state rather than being started one unit at a time, so the start-up times of the outdoor units can be allowed to advance at the same time. Additionally, it suffices simply to sequentially inhibit operation of the target outdoor unit each time the system of each outdoor unit is to be detected. For this reason, it becomes unnecessary to wait for the elapse of the start-up time of the outdoor unit each time the system of each outdoor unit is to be detected.

Thus, it becomes possible to shorten the amount of time required for refrigerant system detection.

Advantageous Effects of the Invention

In the refrigerant system detection method of the first aspect of the invention, it becomes possible to shorten the amount of time required for refrigerant system detection.

In the refrigerant system detection method of the second aspect of the invention, by focusing on a change in temperature, it becomes possible to perform refrigerant system detection.

In the refrigerant system detection method of the third aspect of the invention, by focusing on a change in the temperature of the refrigerant, it becomes possible to perform refrigerant system detection.

In the refrigerant system detection method of the fourth aspect of the invention, by focusing on a change in the temperature of the conditioned air that is detected by the temperature sensors, it becomes possible to perform refrigerant system detection.

In the refrigerant system detection method of the fifth aspect of the invention, it becomes possible to more definitely perform system detection.

In the refrigerant system detection system of the sixth aspect of the invention, it becomes possible to shorten the amount of time required for refrigerant system detection.

In the refrigerant system detection program of the seventh aspect of the invention, it becomes possible to shorten the amount of time required for refrigerant system detection.

DETAILED DESCRIPTION OF THE INVENTION

<Outline Configuration of Air Conditioning System>

Figure 1:
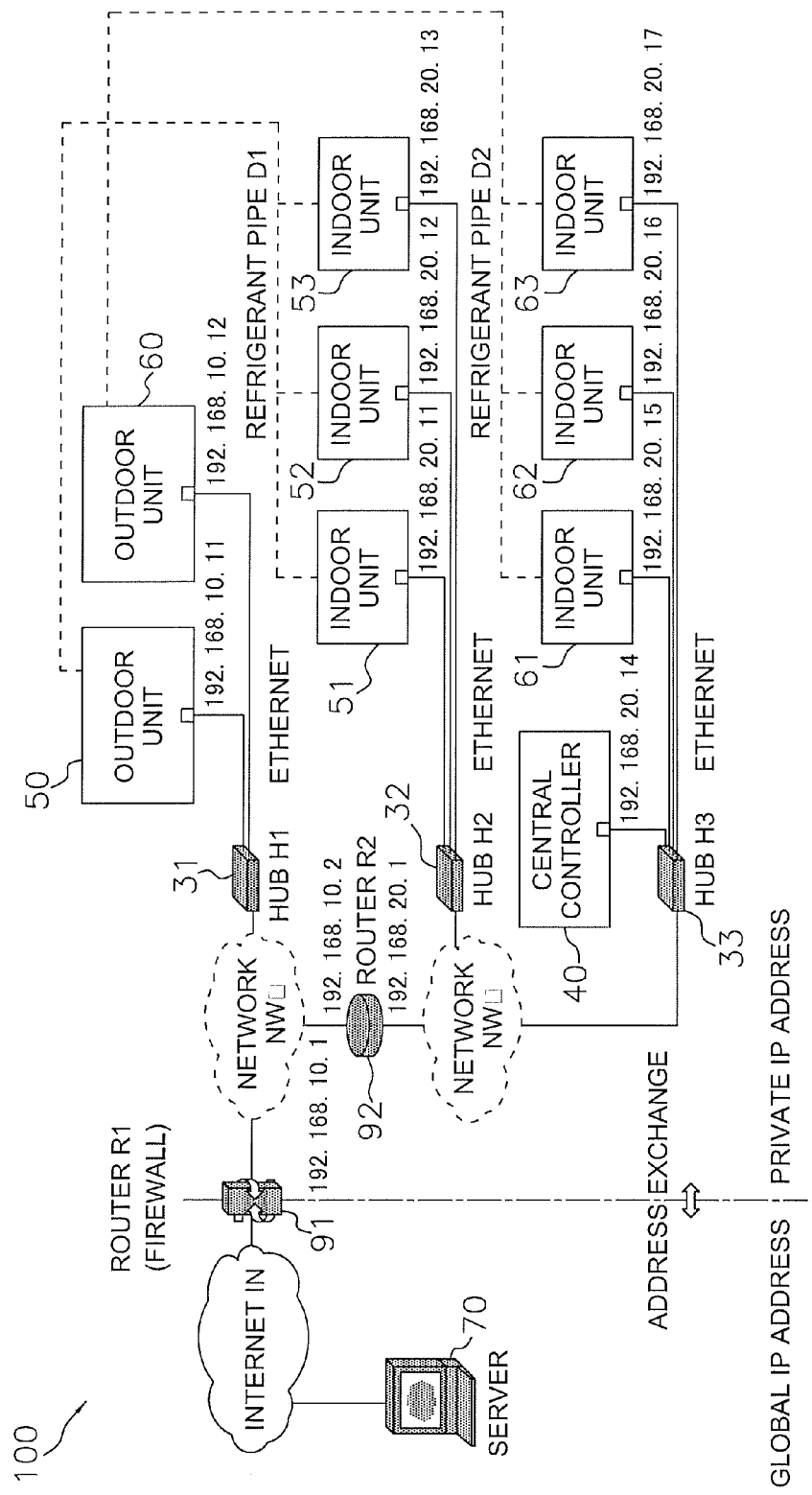
FIG. 1 is a system outline configuration diagram pertaining to an embodiment of the present invention.

FIG. 1 shows an outline configuration diagram of an air conditioning system 100 in which an embodiment of the present invention is employed.

The air conditioning system 100 is, as shown in FIG. 1, configured by a server 70, routers 91 and 92 (routers R1 and R2), hubs 31, 32 and 33 (hubs H1, H2 and H3), outdoor units 50 and 60, and indoor units 51, 52, 53, 61, 62 and 63.

The server 70 is connected to the router 91 via the Internet IN, and communication using a global IP address is performed therebetween.

The router 91 is connected to the router 92 and the hub 31 via a network NW1. A firewall is disposed in this router 91 in order to prevent unauthorized access from the outside. In this router 91, processing that converts a private IP address into a global IP address and processing such as converting IP addresses and port numbers when plural private IP addresses are shared by one global IP address are performed.

The outdoor unit 50 and the outdoor unit 60 are connected by Ethernet (registered trademark) to the hub 31, and the outdoor units 50 and 60 belong to the network NW1. As a result of being mediated by the hub 31 in this manner, the router 91 and the outdoor units 50 and 60 can perform communication by private IP addresses.

The router 92 is connected to the hub 32 and the hub 33 via a network NW2.

The hub 32 is connected to the indoor units 51, 52 and 53 by Ethernet (registered trademark). The indoor units 51, 52 and 53 belong to the network NW2. As a result of being mediated by the hub 32 in this manner, the router 92 and the indoor units 51, 52 and 53 can perform communication by private IP addresses.

A central controller 40 and the indoor units 61, 62 and 63 are connected by Ethernet (registered trademark) to the hub 33. The central controller 40 and the indoor units 61, 62 and 63 also belong to the network NW2. As a result of being mediated by the hub 33 in this manner, the router 92, the indoor units 61, 62 and 63 and the central controller 40 can perform communication by private IP addresses.

The central controller 40 is, similar to an outdoor unit and an indoor unit, one part of an air conditioner is capable of various setting operations in regard to air conditioners in a local network.

The outdoor units 50 and 60 and the indoor units 51, 52, 53, 61, 62 and 63 hold beforehand IDs (MAC addresses) that identify themselves.

It will be noted that it is necessary to wait for the elapse of start-up time until the outdoor units 50 and 60 reach a predetermined stable state after the outdoor units 50 and 60 start operation. "Start-up time" here means an amount of time required until temperatures that temperature sensors 51e, 51f, 52e, 52f, 53e and 53f (see FIG. 16) disposed in front of indoor heat exchangers 51a, 52a and 53a of the indoor units (see FIG. 16) or in back of the indoor heat exchangers 51a, 52a and 53a detect become stable after causing operation of the outdoor units 50 and 60 to start, and, for example, is a predetermined amount of time determined beforehand by experimental data. As an experiment here, for example, there is a conceivable amount of time that is identified by judging that the outdoor units 50 and 60 have become stable when the difference between detection values of the temperature sensors 51e, 51f, 52e, 52f, 53e and 53f before the outdoor units 50 and 60 start operation and detection values of the temperature sensors 51e, 51f, 52e, 52f, 53e and 53f after the outdoor units 50 and 60 start operation is maintained within the range of a predetermined numerical value during a certain period. Here, the outdoor unit 50 and the outdoor unit 60 may have configurations where the start-up time of the outdoor unit 50 and the start-up time of the outdoor unit 60 differ.

Here, the aforementioned air conditioners and the like are, for example, as indicated by the private IP addresses following IPv4 in FIG. 1, system-constructed by a network where IPv4 is built in. The network system may also follow IPv6.

It will be noted that the outdoor units 50 and 60, the indoor units 51, 52, 53, 61, 62 and 63 and the central controller 40 are only physically connected and can perform communication with each other as a result of IP address setting processing discussed later being performed.

Further, although it will be discussed later, at this time, system detection processing that identifies the indoor units that are connected to a given outdoor unit to configure a refrigerant circuit is performed, whereby setting and control according to system becomes possible.

<Address Automatic Setting>

First, as an outline, a global IP address is allocated such that the router 91 can perform, with the server 70 serving as an external server, communication via the Internet IN using a global UP address. Additionally, the router 91 holds plural types of private IP addresses beforehand in order to assign addresses to plural devices that are locally connected. Further, the router 92 that is connected via the network NW1 to the router 91 also similarly holds plural types of private IP addresses in order to assign addresses to devices that are locally connected to the router 92. It will be noted that the outdoor units 50 and 60, the indoor units 51, 52, 53, 61, 62 and 63 and the central controller 40 are divided between and belong to the network NW1 and the network NW2 as a result of being mediated by the router 92.

Details thereof will be described below with reference to flowcharts and explanatory drawings.

Figure 3:
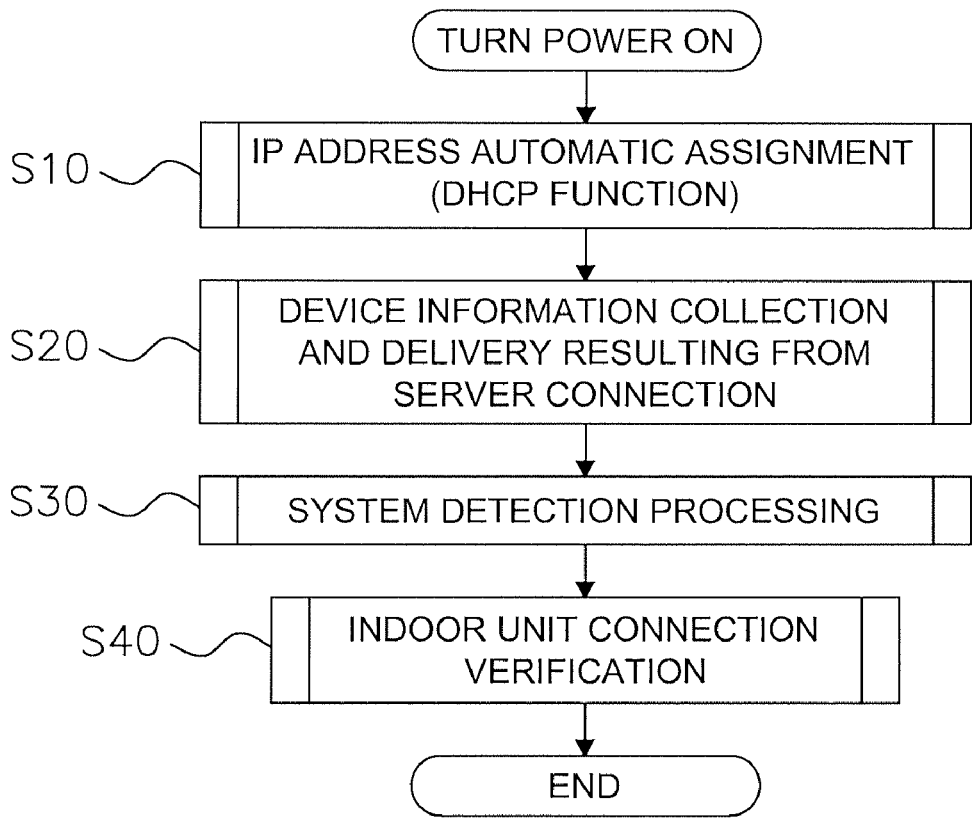
FIG. 3 is an outline flowchart of system setting.

FIG. 3 shows an outline flowchart of address automatic setting.

First, to begin, the flow is started by turning the power ON.

In step S10, automatic assignment of private IP addresses is performed with respect to each air conditioner from the routers 91 and 92.

In step S20, respective device information is transmitted to the server 70 from each air conditioner.

In step S30, refrigerant system detection processing is performed.

In step S40, indoor unit connection verification is performed.

As described above, address automatic setting is performed. Details will be described below in order in each step.
(IP Address Automatic Assignment)

Figure 4:
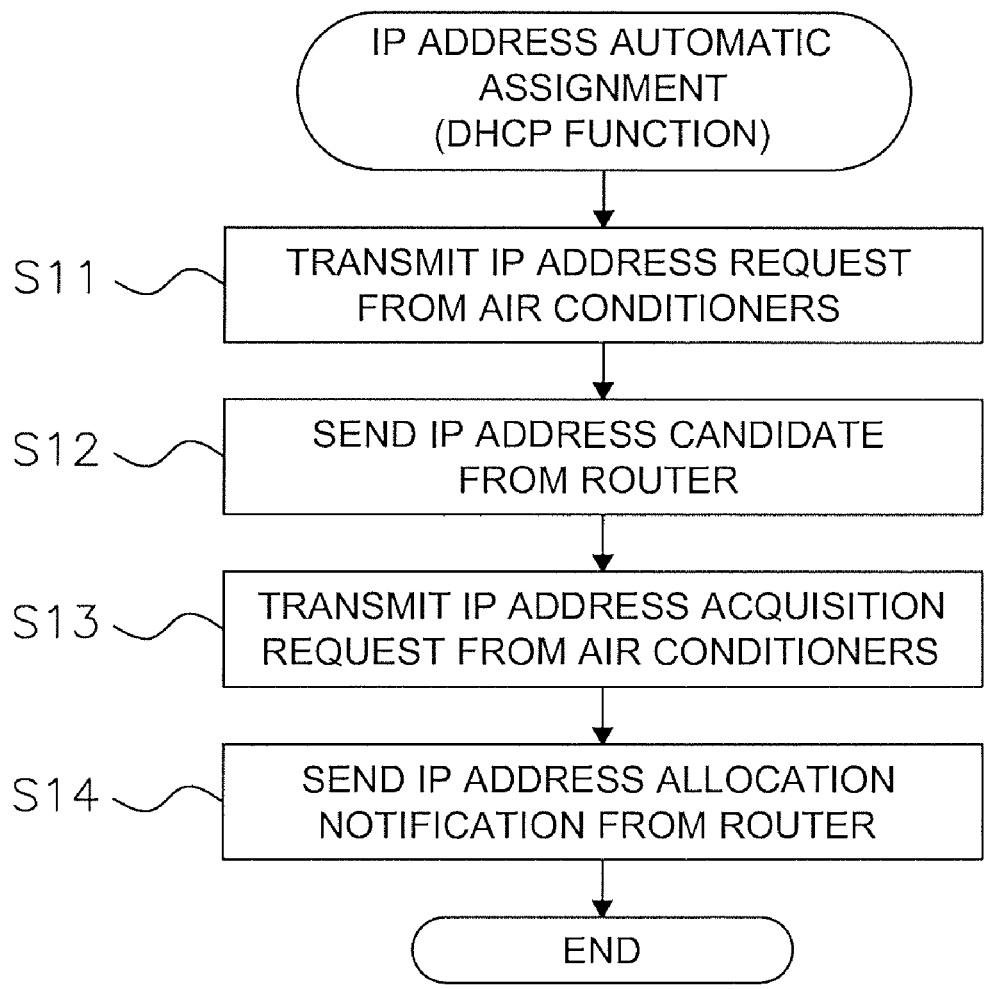
FIG. 4 is a flowchart of IP address automatic assignment.

FIG. 4 shows a flowchart relating to IP address automatic assignment.

Here, a DHCP function is utilized to perform assignment of a private IP address with respect to each air conditioner.

In step S11, each air conditioner that has an ID beforehand transmits a signal requesting a private IP address by broadcasting it to the network (networks NW1, NW2) to which that air conditioner belongs.

In step S12, the routers 91 and 92 that belong to the same network and receive the signal requesting a private IP address send, to each air conditioner, a candidate private IP address from among the private IP addresses that the routers 91 and 92 hold.

In step S13, each air conditioner transmits a signal requesting private IP address acquisition.

In step S14, a private IP address allocation notification is sent to each air conditioner from the routers 91 and 92, and a private IP address correlated with an ID is assigned to each air conditioner.

Figure 8:
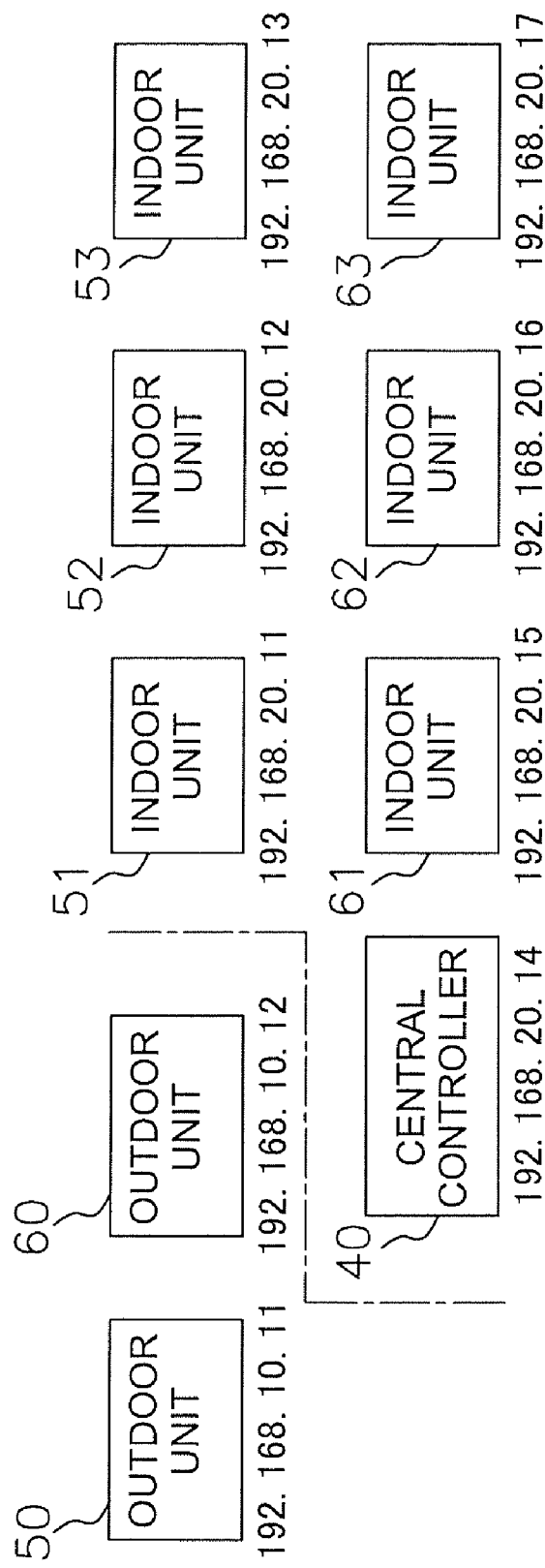
FIG. 8 is an explanatory diagram of a state where IP addresses have been automatically assigned.

Here, in a state where an address has been assigned to each air conditioner, for example, as shown in FIG. 8, there are assigned private IP addresses resulting from 32-bit IPv4 in which binary numbers in octet grouped decimal numbers are written. Private IP addresses resulting from 128-bit IPv6 may also be assigned.

(Device Information Collection)

Figure 2:
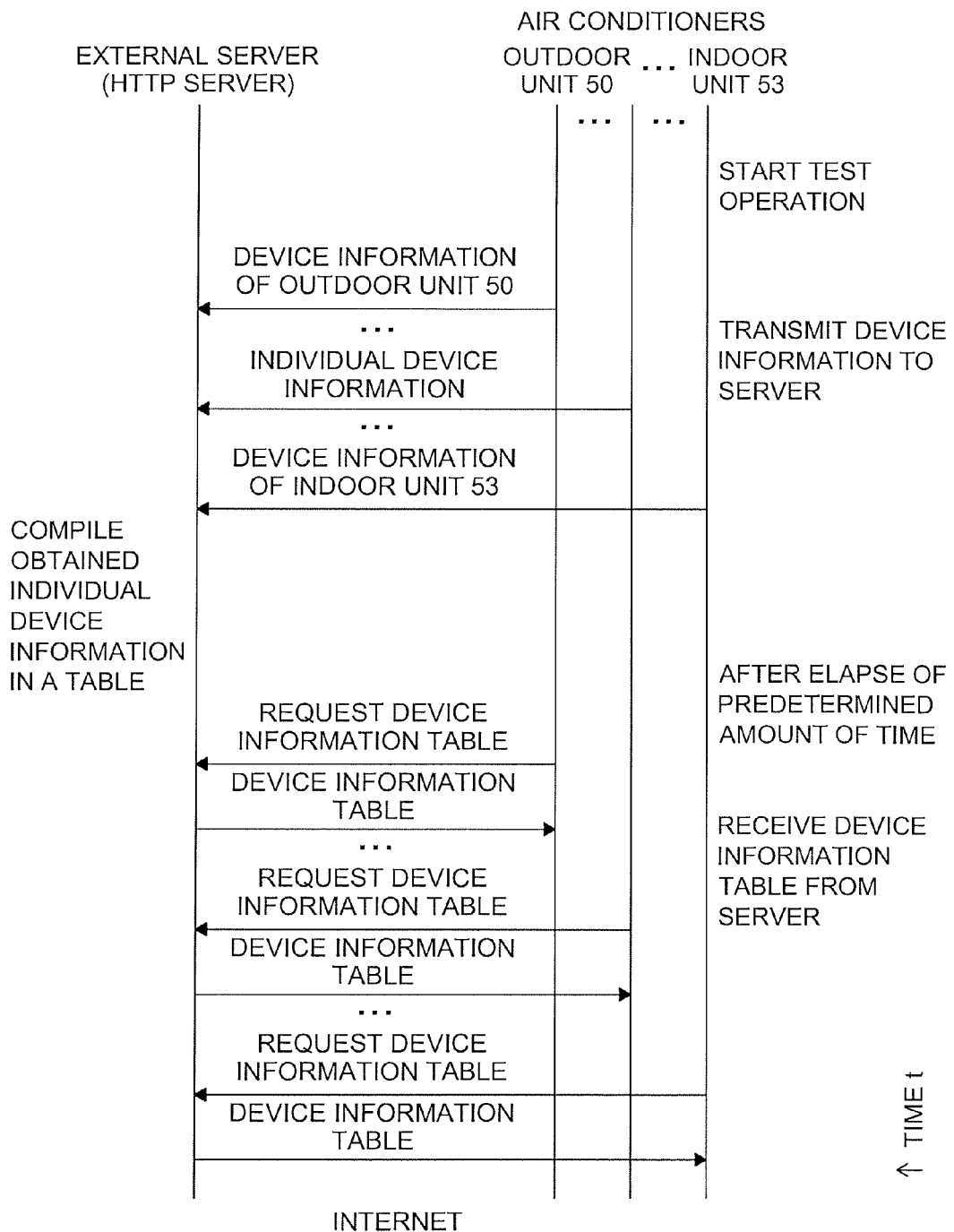
FIG. 2 is a sequence diagram showing an outline of device information collection and delivery processing.

FIG. 2 shows an outline sequence of device information collection and delivery resulting from server connection.

Figure 5:
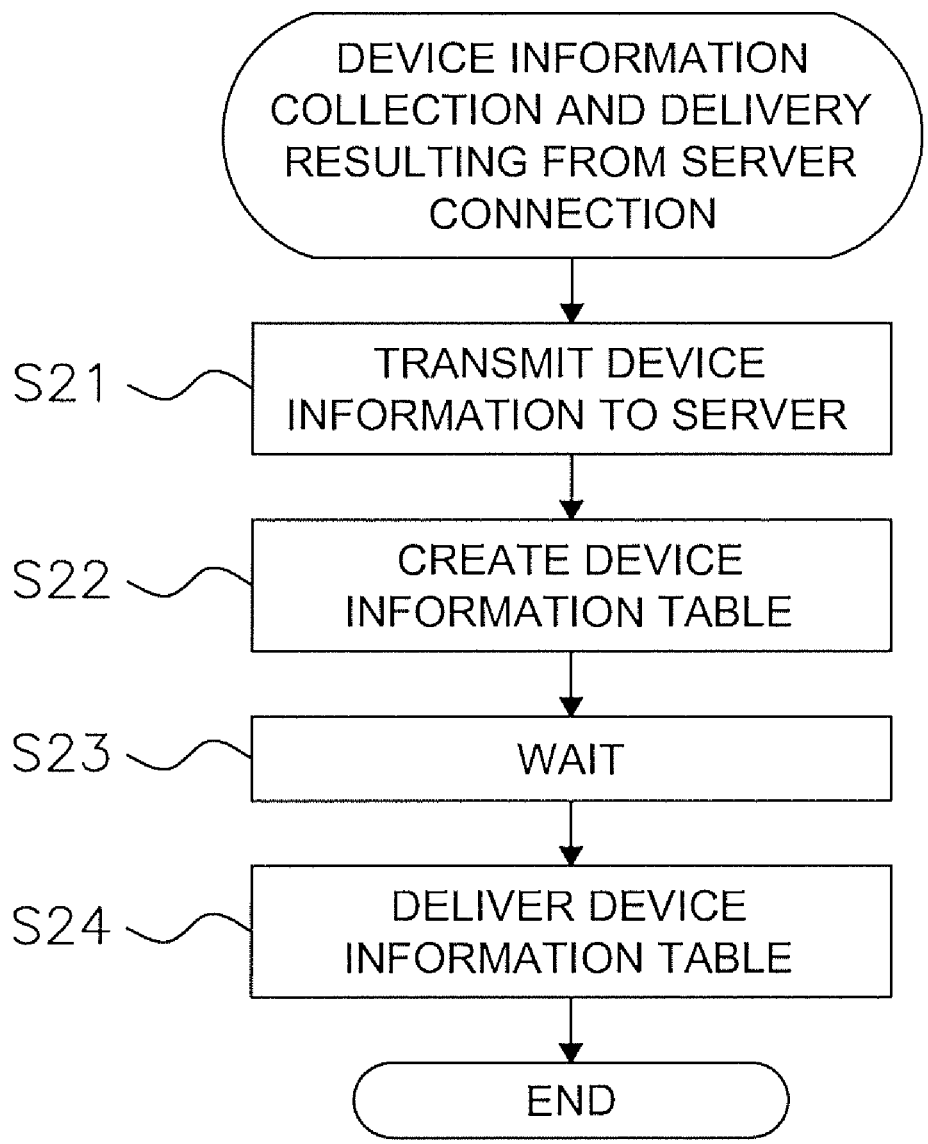
FIG. 5 is a flowchart of device information collection.

FIG. 5 shows a flowchart of device information collection and delivery processing by the server 70 resulting from connecting to the server 70.

In step S21, each air conditioner transmits device information to the server 70 via the Internet IN. Here, in the router 91, the private IP address that has been assigned to each air conditioner is converted into a global IP address. The transmission here converts the IP address and port number in the router 91 such that each air conditioner can send device information to the server 70 using one global IP address.

Figure 13:
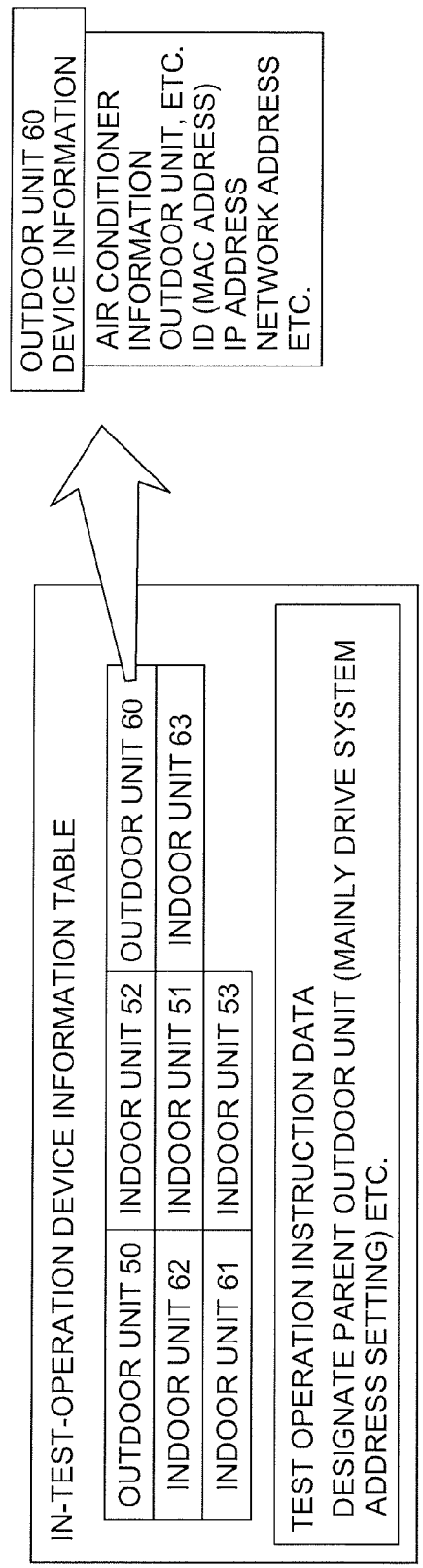
FIG. 13 is an explanatory diagram of a device information table.

In step S22, the server 70 creates a device information table on the basis of the device information that has been transmitted from each air conditioner. The device information table here is, for example, as shown in FIG. 13, configured by, in regard to the outdoor units 50 and 60 and the indoor units 51, 52, 53, 61, 62 and 63, information indicating whether the device is an outdoor unit or an indoor unit, IDs (MAC addresses), the IP addresses that have been automatically assigned in step S10, network addresses, and data identifying parent units of the outdoor units. Of these, the network addresses are addresses corresponding to the networks NW1 and NW2, with the network address corresponding to the network NW1 being 192.168.10 and the network address corresponding to the network NW2 being 192.168.20.

In step S23, the server 70 stands by while creating the device information table until the server 70 is able to acquire device information from all of the air conditioners. Here, the server 70 completes creation of the device information table. The device information table here has the content shown in FIG. 13, for example, and is a table where a list of device information of the outdoor units 50 and 60 and the indoor units 51, 52, 53, 61, 62 and 63 (whether it is an outdoor unit or an indoor unit; IDs (MAC addresses); private IP addresses; network addresses; etc.) and test operation instruction data that designates parent outdoor units are compiled. It will be noted that, because information indicating whether it is an outdoor unit or an indoor unit is included in the device information in this manner, each air conditioner becomes capable of grasping whether a partner with which it performs IP communication is an indoor unit or an outdoor unit by storing the device information table.

In step S24, the server 70 delivers the device information that has been created to each air conditioner. Here, a firewall is disposed in the router 91 in order to prevent hacking. For this reason, the method becomes one where, first, the air conditioners transmit a signal requesting the device information table to the server 70 and where, in response thereto, the server 70 sends the device information table to the air conditioners. In this method, IP addresses and port numbers are converted in the router 91. As a result of the air conditioners separately executing this communication, the device information table is delivered to each air conditioner.

Figure 9:
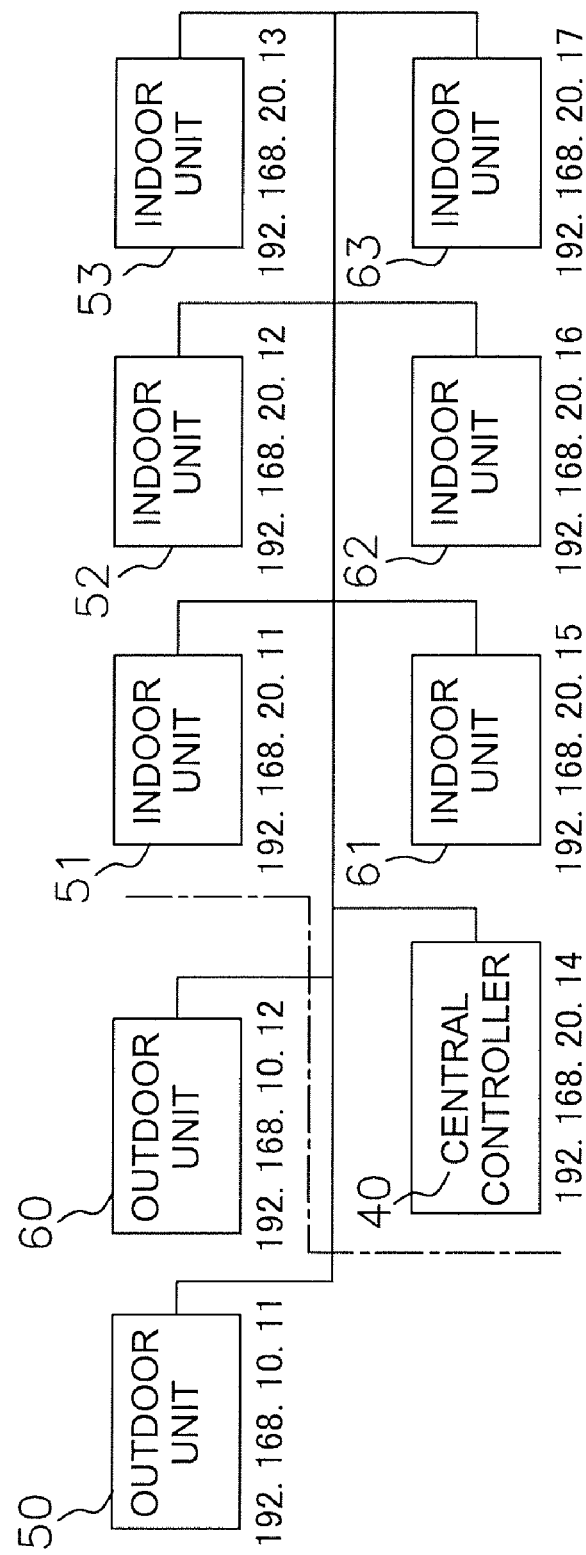
FIG. 9 is an explanatory diagram of a state connected to a server in order to collect device information.
Figure 12:
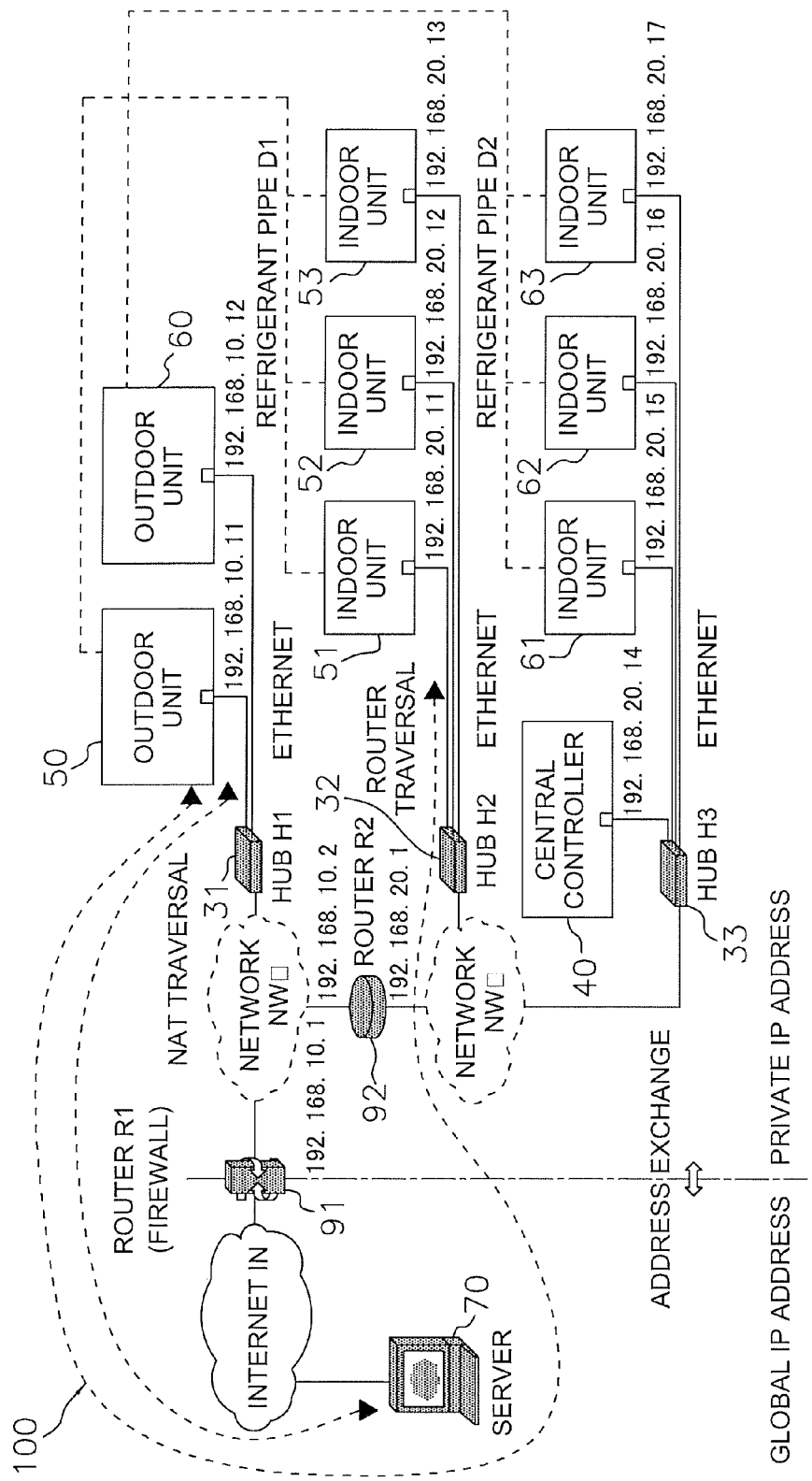
FIG. 12 is a system outline configuration diagram showing NAT traversal and router traversal.

Here, in a state where the device information table has been transmitted to each air conditioner, there is constructed a network where the air conditioners are capable of communicating with each other using private IP addresses such as shown in FIG. 9, for example. It will be noted that these communications can be realized by utilizing NAT traversal technology such as shown in FIG. 12.

(System Detection Processing)

Figure 6:
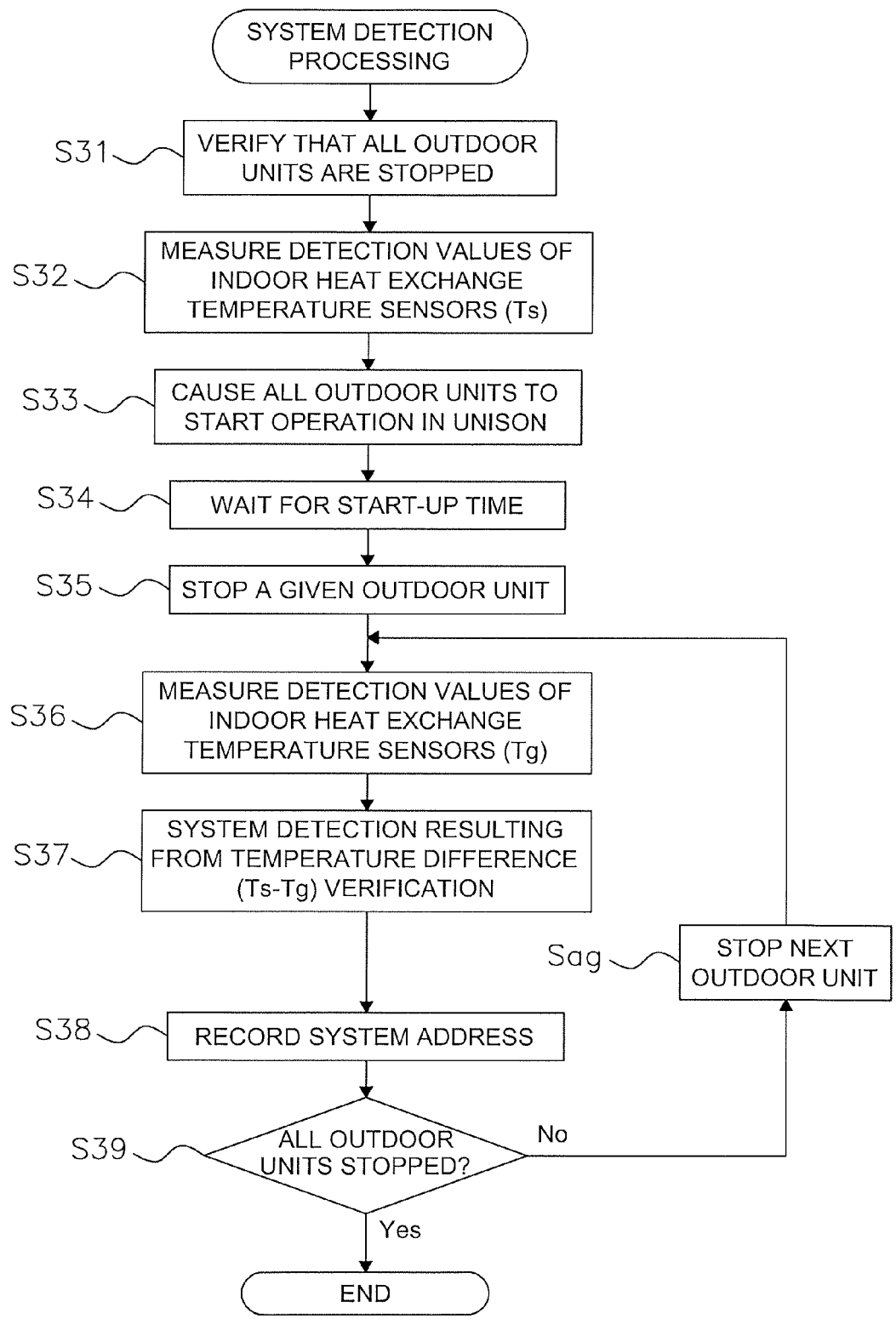
FIG. 6 is a flowchart of system detection processing.

FIG. 6 shows a flowchart in regard to processing that identifies and discriminates the refrigerant systems that plurally exist in the air conditioning system 100.

Figure 15:
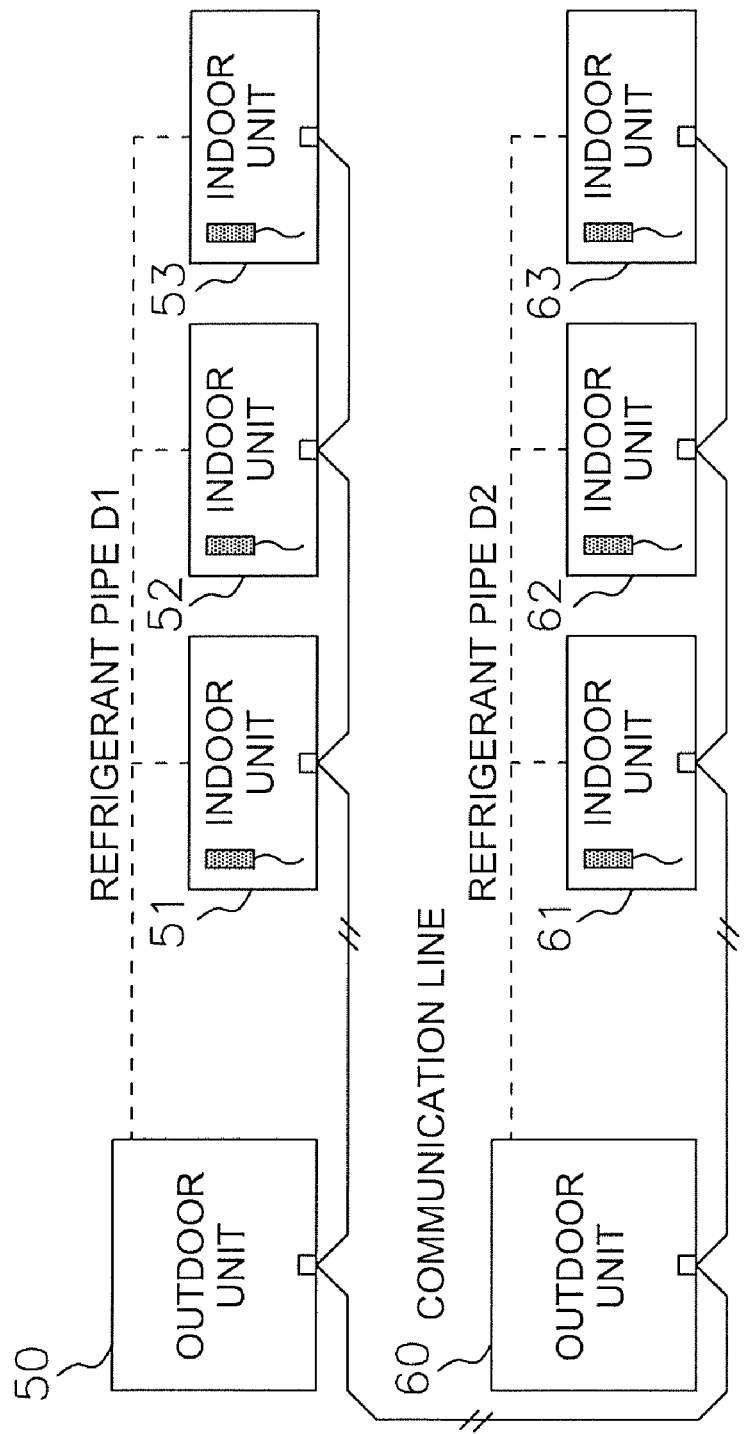
FIG. 15 is an explanatory diagram for performing system detection processing.

The system detection processing here is, for example, as shown in FIG. 15, processing for the server 70 to automatically grasp, when the indoor units 51, 52 and 53 are connected via a refrigerant pipe D1 with respect to the outdoor unit 50 to configure one refrigerant system and the indoor units 61, 62 and 63 are connected via a refrigerant pipe D2 with respect to the outdoor unit 60 to configure one refrigerant system, information of these refrigerant systems. Here, the server 70 detects the refrigerant systems by changes in the detection values of the temperature sensors in each indoor unit when the operating state of each outdoor unit is changed one unit at a time.

Figure 16:
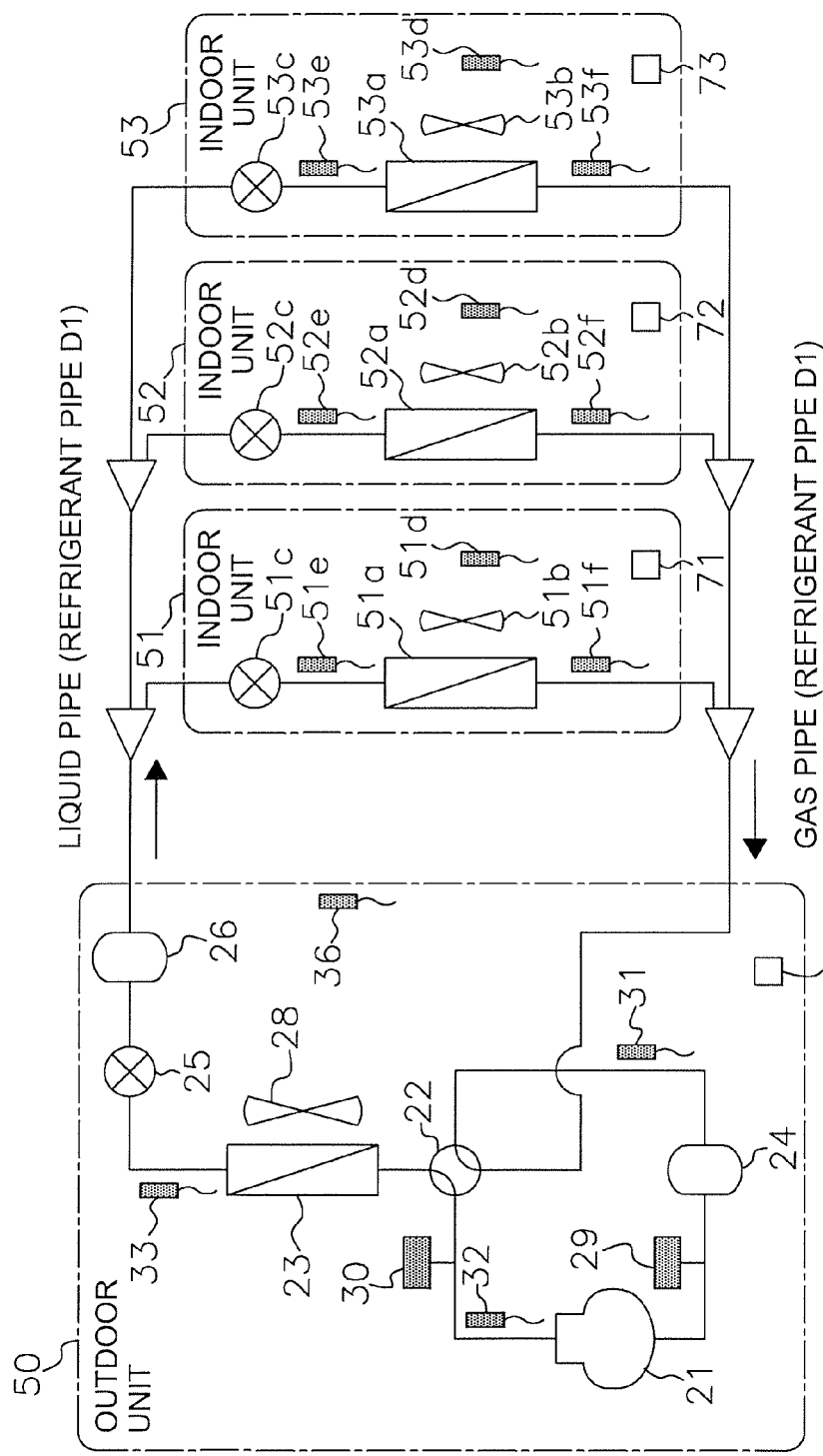
FIG. 16 is a refrigerant circuit outline diagram showing the relationship between an outdoor unit and indoor units of one system.

Here, the configuration of the refrigerant circuit that has the outdoor unit 50 and the indoor units 51, 52 and 53 and which is one refrigerant system will be described with reference to FIG. 16.

Figure 17:
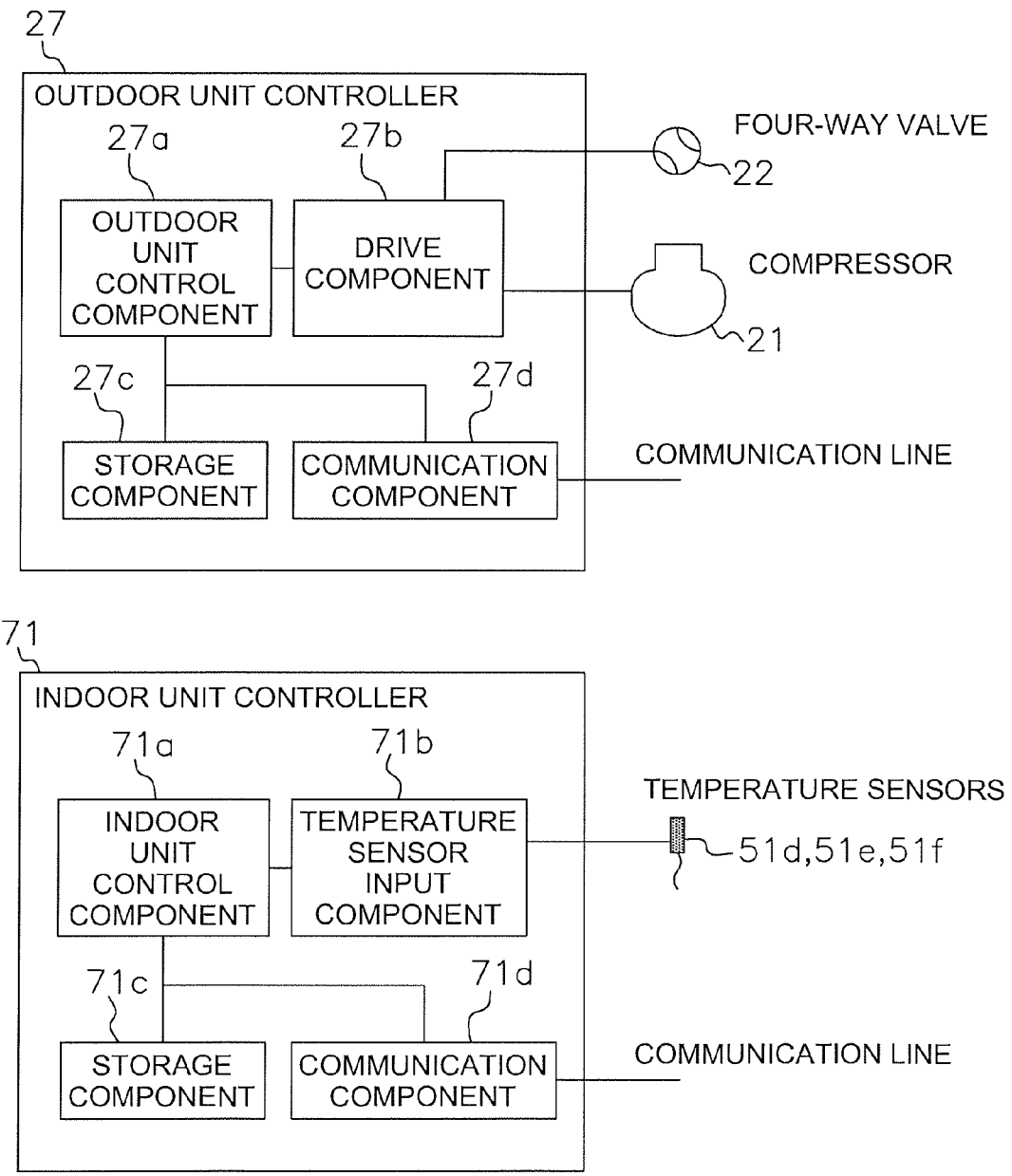
FIG. 17 is an outline configuration diagram of each controller.

The outdoor unit 50 has a compressor 21, a four-way valve 22, an outdoor heat exchanger 23, an accumulator 24, an outdoor expansion valve 25, a receiver 26, an outdoor unit controller 27, an outdoor fan 28, an intake pressure sensor 29, a discharge pressure sensor 30, an intake temperature sensor 31, a discharge temperature sensor 32, an outdoor heat exchange temperature sensor 33 and an outdoor temperature sensor 36. The outdoor unit controller 27 controls the compressor 21 and the outdoor fan 28 by values that the various temperature sensors detect. Specifically, as shown in FIG. 17, the outdoor unit controller 27 is equipped with an outdoor unit control component 27a, a drive component 27b, a storage component 27c and a communication component 27d. Of these, the drive component 27b is connected such that it can transmit control signals to the four-way valve 22 and the compressor 21. Further, a communication line for communicating with other air conditioners and the server 70 extends from the communication component 27d. Further, various programs for executing IP address automatic assignment for performing address automatic setting, device information collection, system detection processing and indoor unit connection verification processing are stored in the storage component 27c.

Further, the indoor unit 51 has an indoor heat exchanger 51a, an indoor fan 51b, an indoor expansion valve 51c, an indoor heat exchange temperature sensor 51d, a liquid side temperature sensor 51e, a gas side temperature sensor 51f and an indoor unit controller 71. It will be noted that the indoor units 52 and 53 are also the same and that members having corresponding member numbers have corresponding functions, so description thereof will be omitted. The indoor unit controllers 71, 72 and 73 perform air volume control of the indoor fan 51b by values that the liquid side temperature sensor 51e and the gas side temperature sensor 51f detect. Specifically, the indoor unit controller 71 has, as shown in FIG. 17, an indoor unit control component 71a, a temperature sensor input component 71b, a storage component 71c and a communication component 71d. Of these, the temperature sensor input component 71b is connected to the various temperature sensors 51d, 51e and 51f. Further, a communication line for communicating with other air conditioners and the server 70 extends from the communication component 71d.

Using the above configuration, the server 70 performs the system detection processing discussed below in accordance with the flow shown in FIG. 6.

In step S31, the server 70 verifies whether or not all of the outdoor units 50 and 60 are stopped. Here, when the server 70 verifies that all of the outdoor units 50 and 60 are stopped, the server 70 moves to step S32. Here, in FIG. 18, which shows the transition of the system detection processing, section 1 represents a time period from when power is turned ON to until the server 70 verifies that the outdoor units are stopped.

In step S32, the server 70 measures detection values Ts of the indoor heat exchange temperature sensors 51d, 52d, 53d, etc., when the outdoor units are stopped.

Figure 18:
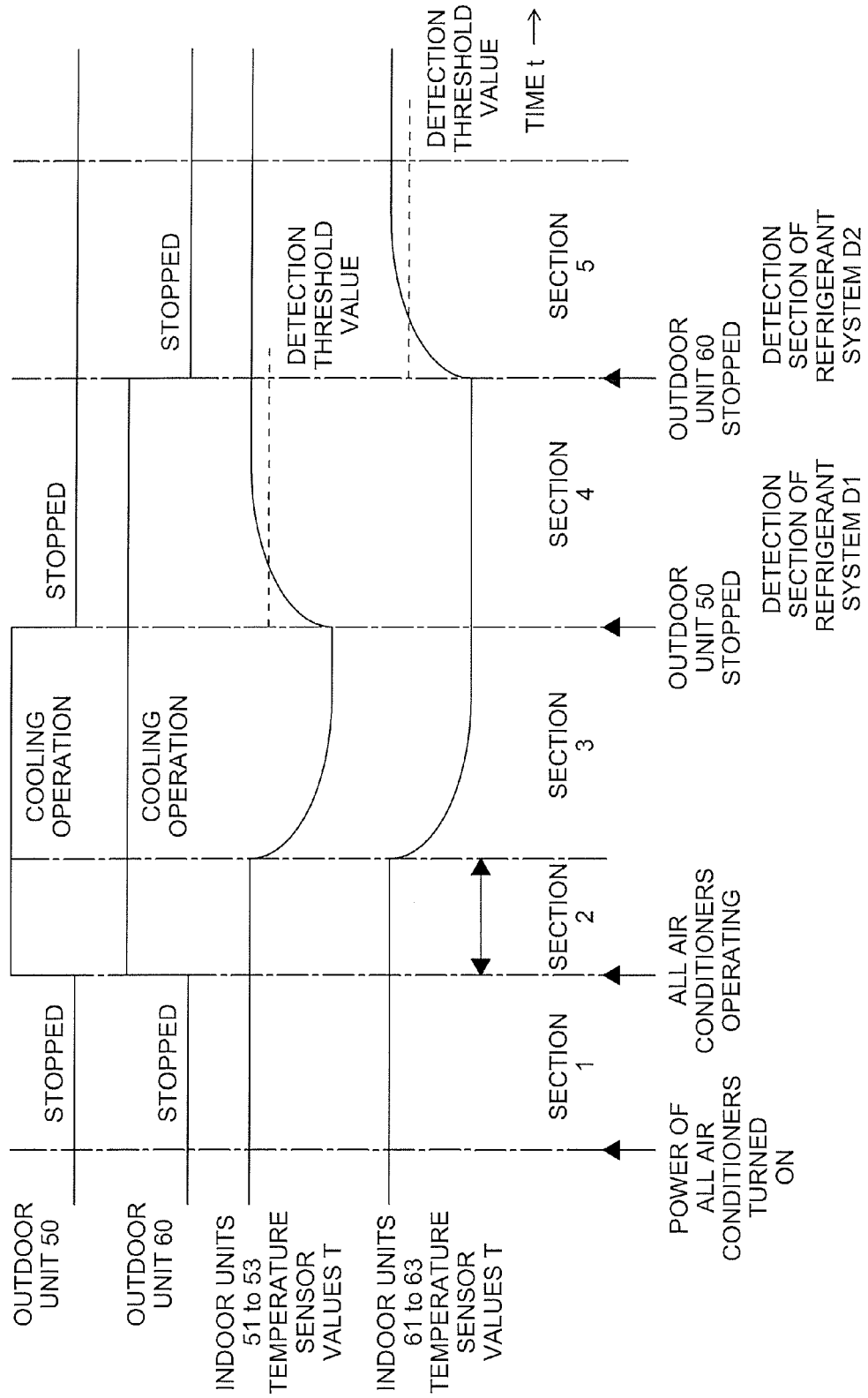
FIG. 18 is a diagram showing transitions of temperature changes resulting from stopping operation.

In step S33, the server 70 causes all of the outdoor units 50 and 60 to start operation in unison. In FIG. 18, this is indicated by the graphs of the outdoor unit 50 and the outdoor unit 60 rising in unison.

In step S34, the start-up times of the outdoor units 50 and 60 whose operation has been started advance at the same time, and the server 70 waits for the start-up times to elapse. For the start-up times, in FIG. 18, a predetermined amount of time is determined beforehand as an amount of time in which section 2, which is a section from when the outdoor unit 50 and the outdoor unit 60 start operation to until the detection values of the indoor heat exchange temperature sensors 51d, 52d, 53d, etc. start changing, elapses and the values detected by the liquid side temperature sensors 51e, 52e and 53e and the gas side temperature sensors 51f, 52f and 53f become constant thereafter in section 3. For this reason, here, whether or not start-up time has elapsed is judged by whether or not this predetermined amount of time has elapsed after the outdoor units start operation.

In step S35, the server 70 causes either one of the outdoor unit 50 and the outdoor unit 60 to stop operation. Here, as shown in FIG. 18, for the purpose of description, a case where the server 70 causes the outdoor unit 50 to stop will be taken as an example and described. As a result of the server 70 causing the outdoor unit 50 to stop in this manner, the detection values of the indoor heat exchange temperature sensors of the indoor units included in the refrigerant system of the outdoor unit 50 become closer to the values that were measured in the state where operation of the outdoor unit 50 was stopped in step S32.

In step S36, the server 70 measures detection values Tg of the indoor heat exchange temperature sensors 51d, 52d and 53d after operation of the outdoor unit 50 has stopped.

In step S37, when the temperature difference between the values Ts that the server 70 measured in the state where operation of the outdoor unit 50 was stopped in step S32 and the values Tg that the server 70 measured in the state where the outdoor unit 50 was stopped in step S36 is equal to or less than a detection threshold value (set beforehand), the server 70 regards the indoor units 51, 52 and 53 having the indoor heat exchange temperature sensors 51d, 52d and 53d as belonging to the same refrigerant system as the outdoor unit 50 and detects them as targets in which the same refrigerant system address as each other is to be held. This is processing that is performed in the time period indicated by section 4 in FIG. 18.

In step S38, the server 70 assigns the same refrigerant system address (e.g., here, the private IP address of the outdoor unit 50) to the outdoor unit 50 and the indoor units 51, 52 and 53 of the same refrigerant system detected in step S37 and causes the outdoor unit 50 and the indoor units 51, 52 and 53 to store that same refrigerant system address. By using, as the refrigerant system address, the private IP address of the outdoor unit of that system in this manner, it becomes unnecessary for the server 70 to create a separate and new private IP address.

In step S39, the server 70 judges whether or not all of the outdoor units 50 and 60 have stopped operation, and when all of the outdoor units 50 and 60 have stopped operation, the server 70 ends the system detection processing. Further, if there are outdoor units that are in operation, the server 70 moves to step Sag.

In step Sag, the server 70 causes one given outdoor unit to stop from among the outdoor units that are in operation. Here, for the purpose of description, the server 70 causes the outdoor unit 60, which is the remaining outdoor unit that is in operation, to stop. Then, the server 70 moves to step S36 and performs the aforementioned processing in the same manner to detect the indoor units of the refrigerant system of the outdoor unit 60. This is processing that is performed in the time period indicated by section 5 in FIG. 18.

Figure 10:
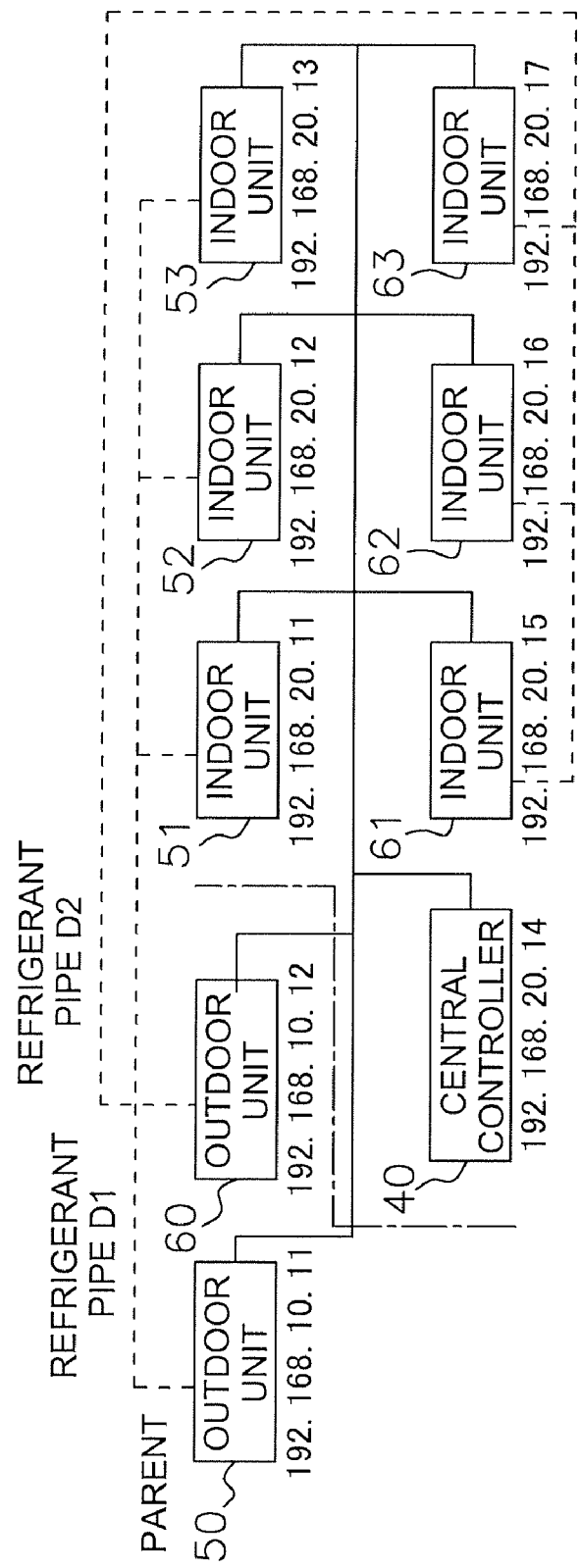
FIG. 10 is an explanatory diagram of system detection.

Because of the above-described processing, the refrigerant systems are grasped and stored, and the fact that the air conditioning system 100 has the networks and refrigerant systems shown in FIG. 10 is grasped in the server 70.

(Indoor Unit Connection Verification)

Figure 7:
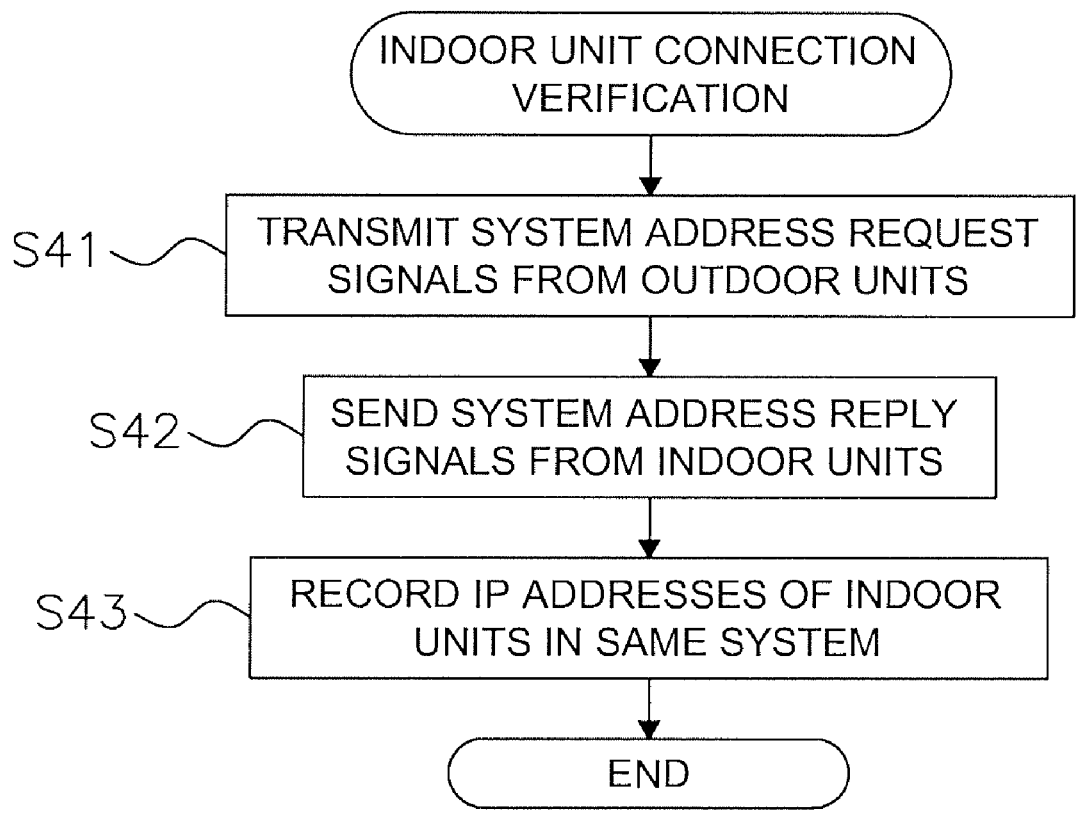
FIG. 7 is a flowchart of indoor unit connection verification.

FIG. 7 shows a flowchart of indoor unit connection verification processing at a stage where a private IP address has been assigned to each air conditioner and refrigerant system detection has also ended.

In step S41, the outdoor units 50 and 60 transmit signals requesting refrigerant system addresses.

In step S42, refrigerant system address reply signals are sent from the indoor units 51, 52 and 53 to the outdoor unit 50, and refrigerant system address reply signals are sent from the indoor units 61, 62 and 63 to the outdoor unit 60.

In step S43, the outdoor units 50 and 60 store the IP addresses of the indoor units in the same system.

Figure 11:
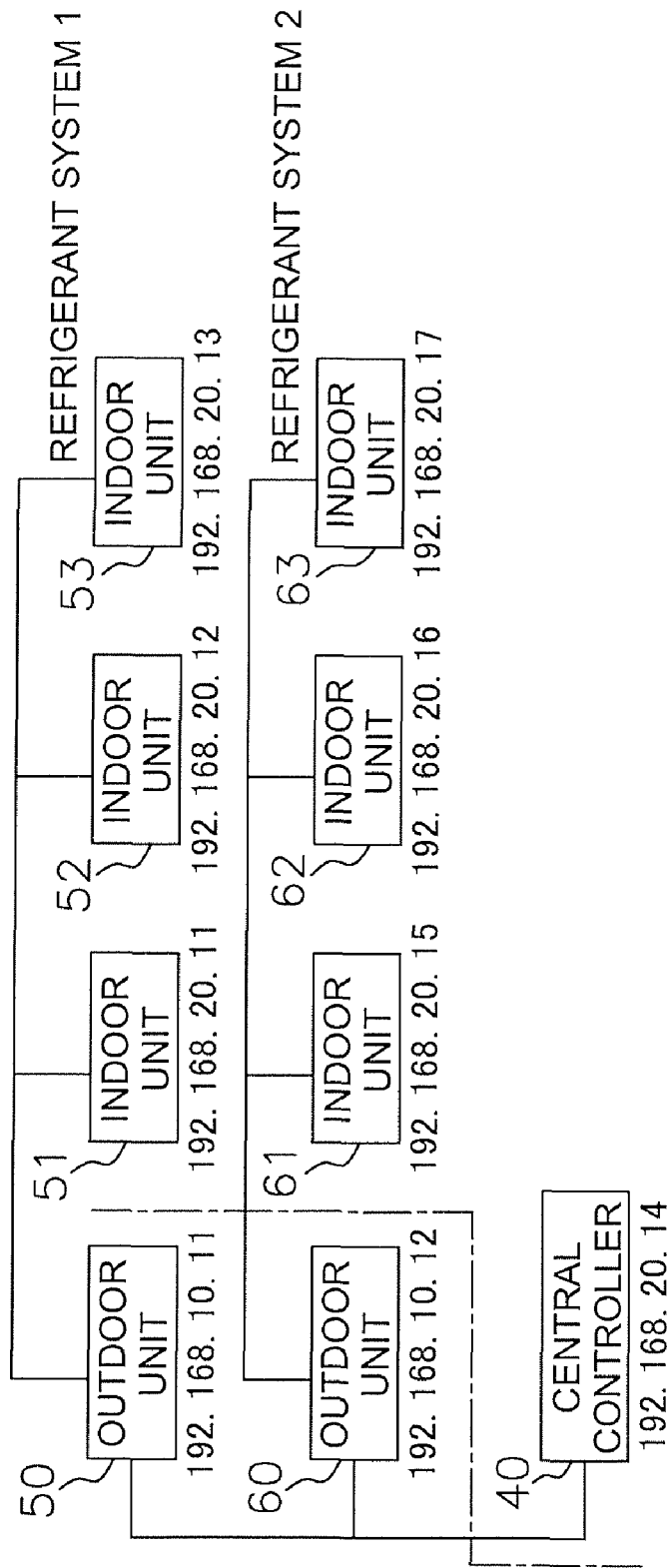
FIG. 11 is an explanatory diagram of indoor unit connection verification.

Thus, the outdoor units 50 and 60 and the indoor units 51, 52, 53, 61, 62 and 63 can grasp the connection relationship and refrigerant system relationship such as shown in FIG. 11 while correlating those relationships with private IP addresses.

Figure 14:
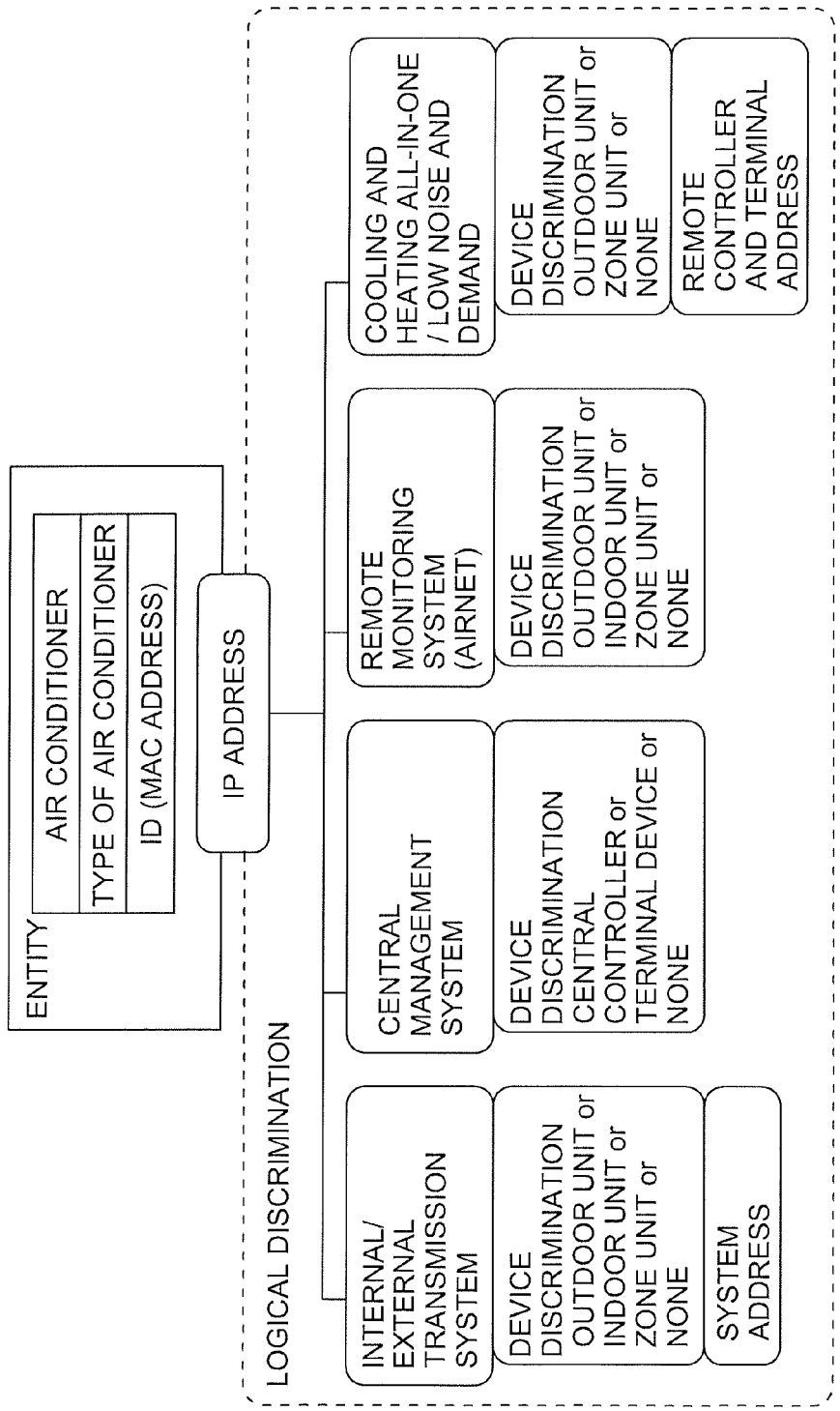
FIG. 14 is an explanatory diagram of information that each air conditioner holds.

It will be noted that the individual air conditioners reach a state where they can grasp hierarchical self data such as shown in FIG. 14, for example. Further, these communications can be realized by utilizing broadcast router traversal technology such as shown in FIG. 12.

Due to the above, address setting processing differentiated by refrigerant system ends.

<Characteristics of Air Conditioning System 100 Pertaining to Present Embodiment>

Figure 19:
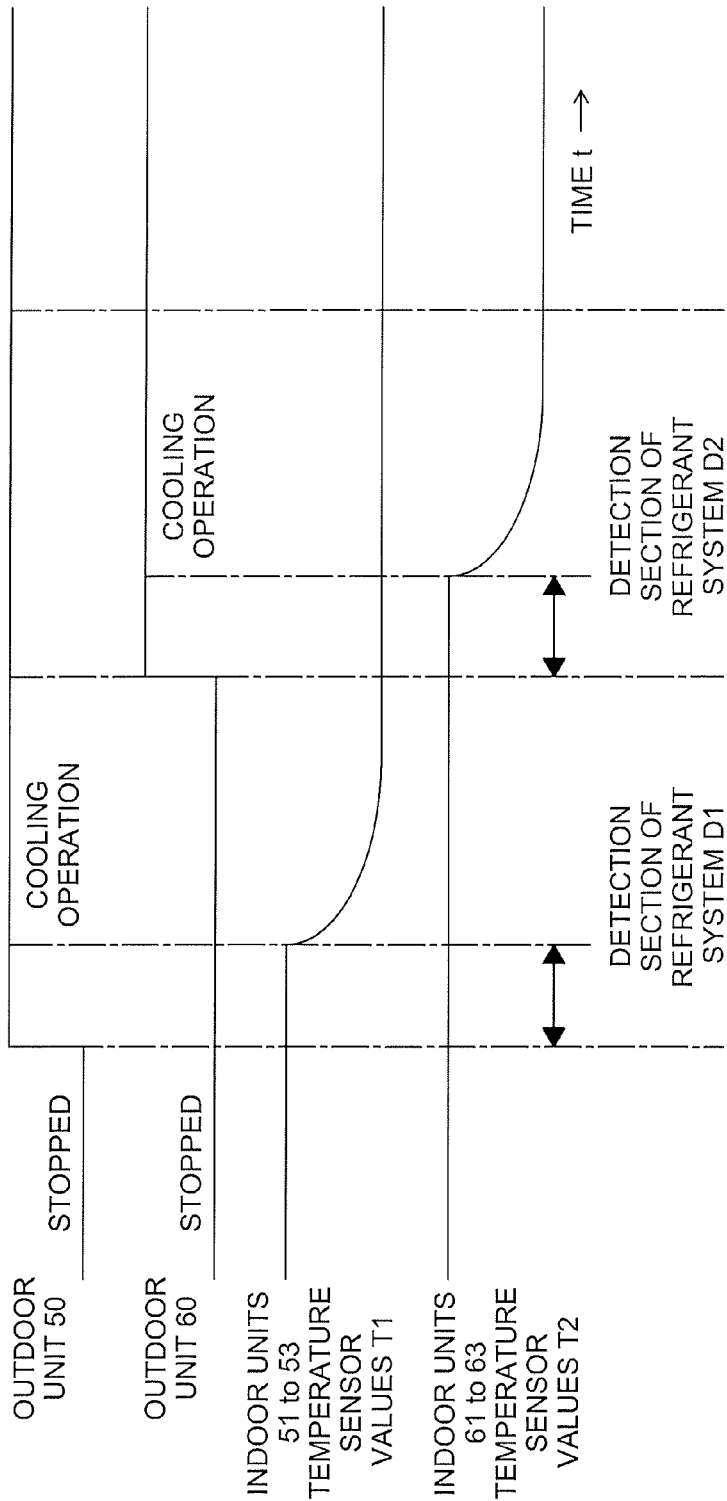
FIG. 19 is a diagram showing transitions of temperature changes in conventional refrigerant system detection.

In a conventional air conditioning system, for example, as shown in FIG. 19, refrigerant system detection is performed by causing the outdoor units to start operation one unit at a time and identifying the indoor units in which a temperature change occurs. For this reason, as shown in FIG. 19, there arises the need to wait for the elapse of the start-up time of the outdoor unit each time operation of the outdoor units is started for detection of each refrigerant system. For this reason, as a result, it takes a lot of time to detect the refrigerant systems.

In contrast, in the air conditioning system 100 of the present embodiment, refrigerant system detection is performed by first placing both of the outdoor units 50 and 60 in a driven state and thereafter stopping, one unit at a time, the outdoor unit on which refrigerant system detection is to be performed. For this reason, when detecting the refrigerant system of each outdoor unit, it suffices simply to stop the outdoor unit, and it is not necessary to wait for the elapse of the start-up time. For this reason, it becomes possible to perform refrigerant system detection in a shorter amount of time than the conventional method.

<Modifications of Air Conditioning System 100>

An embodiment of the present invention has been described above on the basis of the drawings, but the specific configuration thereof is not limited to this embodiment and is alterable in a scope that does not depart from the gist of the invention.

In the preceding embodiment, a case where control that causes the outdoor units 50 and 60 in operation to stop is performed for refrigerant system detection has been taken as an example and described.

However, the present invention is not limited to this and may also be configured such that, rather than completely stopping the outdoor units 50 and 60 in operation, for example, as shown in FIG. 17, control that weakens the output that drives the compressor 21 is performed by the outdoor unit control component 27a and the drive component 27b. In this case also, the values of the temperature sensors of the indoor units of the same refrigerant system also change, so the refrigerant system can be detected in the same manner as in the preceding embodiment.

INDUSTRIAL APPLICABILITY

By utilizing the present invention, it becomes possible to perform refrigerant system detection in a short amount of time, so the invention can be used particularly as a method of automatically detecting refrigerant systems of an air conditioning system configured by plural outdoor units and indoor units.

What is claimed is:

1. A refrigerant system detection method for detecting refrigerant systems in an air conditioning system including a plurality of indoor units having physical quantity sensors respectively and a plurality of outdoor units connected to the plurality of indoor units respectively, the refrigerant system detection method comprising:
a drive step putting the plural outdoor units into a driven state after a start-up time required for start-up;
an operation inhibition step inhibiting operation by stopping or weakening output of the outdoor units one unit at a time after the drive step; and
a recording step correlating and recording
the outdoor units on which operation has been inhibited and
the indoor units in which detection values of the physical quantity sensors have changed as a result of operation of the outdoor units being inhibited.

2. The refrigerant system detection method according to claim 1, wherein
the physical quantity sensors are temperature sensors.

3. The refrigerant system detection method according to claim 2, wherein
the indoor units have indoor heat exchangers, and
the temperature sensors detect temperature of refrigerant flowing through the indoor heat exchangers.

4. The refrigerant system detection method according to claim 2, wherein
the indoor units condition temperature of indoor air, and
the temperature sensors detect temperature of conditioned air conditioned by the indoor units.

5. The refrigerant system detection method according to claim 3, wherein
the start-up time is an amount of time required from when operation of the outdoor units is started to when the temperature detected by the temperature sensors becomes constant.

6. A refrigerant system detection system comprising:
a plurality of indoor units having physical quantity sensors respectively;
a plurality of outdoor units connected to the indoor units to form parts of refrigerant circuits; and
a management component configured
to put the plurality of outdoor units into a driven state after a start-up time required for start-up,
to perform operation inhibition control that stops or weakens output of the outdoor units one unit at a time, and to correlate and record
the outdoor units on which the operation inhibition control has been performed and
the indoor units in which detection values of the physical quantity sensors have changed as a result of the operation inhibition control of the outdoor units being performed.

7. A storage component having a refrigerant system detection program stored therein for detecting refrigerant systems in an air conditioning system comprising a plurality of indoor units having physical quantity sensors respectively connected to a plurality of outdoor units, comprising:
a drive instruction for putting the plural outdoor units into a driven state after a start-up time required for start-up by a management component;
an operation inhibition instruction for inhibiting operation by stopping or weakening the output of the outdoor units one unit at a time after the drive step by the management component; and
a recording instruction for correlating and recording
the outdoor units on which operation has been inhibited and
the indoor units in which detection values of the physical quantity sensors have changed as a result of operation of the outdoor units being inhibited by the management component.

8. The refrigerant system detection method according to claim 4, wherein
the start-up time is an amount of time from when operation of the outdoor units is started to when the temperature detected by the temperature sensors becomes constant.

9. The refrigerant system detection system according to claim 6, wherein
the physical quantity sensors are temperature sensors.

10. The refrigerant system detection system according to claim 9, wherein
the indoor units have indoor heat exchangers, and
the temperature sensors detect temperature of refrigerant flowing through the indoor heat exchangers.

11. The refrigerant system detection system according to claim 10, wherein
the start-up time is an amount of time from when operation of the outdoor units is started to when the temperature detected by the temperature sensors becomes constant.

12. The refrigerant system detection system according to claim 9, wherein
the indoor units condition temperature of indoor air, and
the temperature sensors detect temperature of conditioned air conditioned by the indoor units.

13. The refrigerant system detection system according to claim 12, wherein
the start-up time is an amount of time from when operation of the outdoor units is started to when the temperature detected by the temperature sensors becomes constant.

* * * * *